United States Patent
Nachenberg et al.

(10) Patent No.: US 7,203,959 B2
(45) Date of Patent: *Apr. 10, 2007

(54) STREAM SCANNING THROUGH NETWORK PROXY SERVERS

(75) Inventors: Carey S. Nachenberg, Northridge, CA (US); Elias E. Guy, Williamsburg, VA (US)

(73) Assignee: Symantec Corporation, Cupertino, CA (US)

( * ) Notice: Subject to any disclaimer, the term of this patent is extended or adjusted under 35 U.S.C. 154(b) by 832 days.

This patent is subject to a terminal disclaimer.

(21) Appl. No.: 10/388,903

(22) Filed: Mar. 14, 2003

(65) Prior Publication Data

US 2004/0181687 A1    Sep. 16, 2004

(51) Int. Cl.
G06F 11/30 (2006.01)
H04L 9/00 (2006.01)

(52) U.S. Cl. .................. 726/22; 713/176; 713/187; 713/188

(58) Field of Classification Search .................... None
See application file for complete search history.

(56) References Cited

U.S. PATENT DOCUMENTS

| | | | |
|---|---|---|---|
| 5,398,196 A | 3/1995 | Chambers | |
| 5,440,723 A | 8/1995 | Arnold et al. | |
| 5,452,442 A | 9/1995 | Kephart | |
| 5,473,769 A | 12/1995 | Cozza | |
| 5,572,590 A | 11/1996 | Chess | |
| 5,675,710 A | 10/1997 | Lewis | |
| 5,696,822 A | 12/1997 | Nachenberg | |
| 5,715,174 A | 2/1998 | Cotichini et al. | |
| 5,715,464 A | 2/1998 | Crump et al. | |
| 5,758,359 A | 5/1998 | Saxon | |
| 5,812,763 A | 9/1998 | Teng | |
| 5,826,249 A | 10/1998 | Skeirik | |
| 5,832,208 A | 11/1998 | Chen et al. | |
| 5,854,916 A | 12/1998 | Nachenberg | |
| 5,889,943 A | 3/1999 | Ji et al. | |
| 5,949,973 A | 9/1999 | Yarom | |
| 5,951,698 A | 9/1999 | Chen et al. | |

(Continued)

FOREIGN PATENT DOCUMENTS

DE      100 21 686 A1    11/2001

(Continued)

OTHER PUBLICATIONS

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html..

(Continued)

Primary Examiner—Christopher Revak
(74) Attorney, Agent, or Firm—Fenwick & West LLP

(57) ABSTRACT

Methods, systems, and computer readable media for managing transmission of a requested computer file (140) from a remote host compute (125) to a client computer (120). A proxy server computer (110) receives a first chunk (315) of the requested computer file (140). The proxy server (120) generates a hash of the chunk (315) and compares the hash to a hash of a chunk of previously downloaded file. If the two hashes are identical, the chunk (315) of the requested computer file (140) is passed to the client computer (120).

23 Claims, 6 Drawing Sheets

U.S. PATENT DOCUMENTS

| | | | |
|---|---|---|---|
| 5,956,481 | A | 9/1999 | Walsh et al. |
| 5,960,170 | A | 9/1999 | Chen et al. |
| 5,974,549 | A | 10/1999 | Golan |
| 5,978,917 | A | 11/1999 | Chi |
| 5,987,610 | A | 11/1999 | Franczek et al. |
| 6,021,510 | A * | 2/2000 | Nachenberg ............... 714/38 |
| 6,023,723 | A | 2/2000 | McCormick et al. |
| 6,052,709 | A | 4/2000 | Paul |
| 6,070,244 | A | 5/2000 | Orchier et al. |
| 6,072,830 | A | 6/2000 | Proctor et al. |
| 6,072,942 | A | 6/2000 | Stockwell et al. |
| 6,088,803 | A | 7/2000 | Tso et al. |
| 6,092,194 | A | 7/2000 | Touboul |
| 6,094,731 | A | 7/2000 | Waldin et al. |
| 6,104,872 | A | 8/2000 | Kubota et al. |
| 6,108,799 | A | 8/2000 | Boulay et al. |
| 6,161,130 | A | 12/2000 | Horvitz et al. |
| 6,167,434 | A | 12/2000 | Pang |
| 6,192,379 | B1 | 2/2001 | Bekenn |
| 6,199,181 | B1 | 3/2001 | Rechef et al. |
| 6,253,169 | B1 | 6/2001 | Apte et al. |
| 6,275,938 | B1 | 8/2001 | Bond et al. |
| 6,298,351 | B1 | 10/2001 | Castelli et al. |
| 6,338,141 | B1 | 1/2002 | Wells |
| 6,347,310 | B1 | 2/2002 | Passera |
| 6,357,008 | B1 | 3/2002 | Nachenberg |
| 6,370,526 | B1 | 4/2002 | Agrawal et al. |
| 6,370,648 | B1 | 4/2002 | Diep |
| 6,397,200 | B1 | 5/2002 | Lynch et al. |
| 6,397,215 | B1 | 5/2002 | Kreulen et al. |
| 6,421,709 | B1 | 7/2002 | McCormick et al. |
| 6,424,960 | B1 | 7/2002 | Lee et al. |
| 6,442,606 | B1 | 8/2002 | Subbaroyan et al. |
| 6,456,991 | B1 | 9/2002 | Srinivasa et al. |
| 6,493,007 | B1 | 12/2002 | Pang |
| 6,502,082 | B1 | 12/2002 | Toyama et al. |
| 6,505,167 | B1 | 1/2003 | Horvitz et al. |
| 6,535,891 | B1 | 3/2003 | Fisher et al. |
| 6,552,814 | B2 | 4/2003 | Okimoto et al. |
| 6,611,925 | B1 | 8/2003 | Spear |
| 6,622,150 | B1 | 9/2003 | Kouznetsov et al. |
| 6,678,734 | B1 | 1/2004 | Haatainen et al. |
| 6,697,950 | B1 | 2/2004 | Ko |
| 6,721,721 | B1 | 4/2004 | Bates et al. |
| 6,748,534 | B1 | 6/2004 | Gryaznov et al. |
| 6,763,462 | B1 | 7/2004 | Marsh |
| 6,813,712 | B1 | 11/2004 | Luke |
| 6,851,057 | B1 | 2/2005 | Nachenberg |
| 6,910,134 | B1 | 6/2005 | Maher et al. |
| 2002/0004908 | A1 | 1/2002 | Galea |
| 2002/0035693 | A1 | 3/2002 | Eyres et al. |
| 2002/0035696 | A1 | 3/2002 | Thacker |
| 2002/0038308 | A1 | 3/2002 | Cappi |
| 2002/0046275 | A1 | 4/2002 | Crosbie et al. |
| 2002/0073046 | A1 | 6/2002 | David |
| 2002/0083175 | A1 | 6/2002 | Afek et al. |
| 2002/0087649 | A1 | 7/2002 | Horvitz |
| 2002/0091940 | A1 | 7/2002 | Wellborn et al. |
| 2002/0138525 | A1 | 9/2002 | Karadimitriou et al. |
| 2002/0147694 | A1 | 10/2002 | Dempsey et al. |
| 2002/0147782 | A1 | 10/2002 | Dimitrova et al. |
| 2002/0157008 | A1 | 10/2002 | Radatti |
| 2002/0162015 | A1 | 10/2002 | Tang |
| 2002/0178374 | A1 | 11/2002 | Swimmer et al. |
| 2002/0178375 | A1 | 11/2002 | Whittaker et al. |
| 2002/0194488 | A1 | 12/2002 | Cormack et al. |
| 2002/0199186 | A1 | 12/2002 | Ali et al. |
| 2002/0199194 | A1 | 12/2002 | Ali |
| 2003/0023865 | A1 | 1/2003 | Cowie et al. |
| 2003/0033587 | A1 | 2/2003 | Ferguson et al. |
| 2003/0051026 | A1 | 3/2003 | Carter et al. |
| 2003/0061487 | A1 * | 3/2003 | Angelo et al. ............... 713/176 |
| 2003/0065926 | A1 | 4/2003 | Schultz et al. |
| 2003/0115458 | A1 | 6/2003 | Song |
| 2003/0115479 | A1 | 6/2003 | Edwards et al. |
| 2003/0115485 | A1 | 6/2003 | Milliken |
| 2003/0120951 | A1 | 6/2003 | Gartside et al. |
| 2003/0126449 | A1 | 7/2003 | Kelly et al. |
| 2003/0140049 | A1 | 7/2003 | Radatti |
| 2003/0191966 | A1 | 10/2003 | Gleichauf |
| 2003/0212902 | A1 | 11/2003 | van der Made |
| 2003/0236995 | A1 | 12/2003 | Fretwell, Jr. |
| 2004/0015712 | A1 | 1/2004 | Szor |
| 2004/0015726 | A1 | 1/2004 | Szor |
| 2004/0030913 | A1 | 2/2004 | Liang et al. |
| 2004/0039921 | A1 | 2/2004 | Chuang |
| 2004/0158730 | A1 | 8/2004 | Sarkar |
| 2004/0162808 | A1 | 8/2004 | Margolus et al. |
| 2004/0162885 | A1* | 8/2004 | Garg et al. ............... 709/213 |
| 2004/0181687 | A1 | 9/2004 | Nachenberg et al. |
| 2005/0021740 | A1 | 1/2005 | Bar et al. |
| 2005/0044406 | A1 | 2/2005 | Stute |
| 2005/0132205 | A1 | 6/2005 | Palliyil et al. |
| 2005/0177736 | A1 | 8/2005 | De los Santos et al. |
| 2005/0204150 | A1 | 9/2005 | Peikari |
| 2006/0064755 | A1 | 3/2006 | Azadet et al. |

FOREIGN PATENT DOCUMENTS

| | | |
|---|---|---|
| EP | 0636977 A2 | 2/1995 |
| EP | 1 280 039 A | 1/2003 |
| EP | 1408393 A2 | 4/2004 |
| GB | 2 364 142 A | 1/2002 |
| WO | WO 93/25024 A1 | 12/1993 |
| WO | WO 97/39399 A | 10/1997 |
| WO | WO 99/15966 A1 | 4/1999 |
| WO | WO 00/28420 A2 | 5/2000 |
| WO | WO 01/37095 A1 | 5/2001 |
| WO | WO 01/91403 A | 11/2001 |
| WO | WO 02/05072 A | 1/2002 |
| WO | WO 02/33525 A2 | 4/2002 |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Burchell, Jonathan, "NetShield 1.5", Virus Bulletin, Aug. 1994, pp. 21-23, XP 000617453.

Szor, P. and Ferrie, P., "Attacks in Win32' Part II", Virus Bulletin Conference, Sep. 2000, Virus Bulletin Ltd., The Pentagon, Abingdon, Oxfordshire, England, pp. 47-68.

Szor, P. and Ferrie, P., Attacks on Win=, Virus Bulletin Conference, Sep. 1998, Virus Bulletin Ltd., The Pentagon, Abingdon, Oxfordshire, England, pp. 57-84. Kundschau, Hallwag, Bern CH vol. 84, No. 36. Sep. 4, 1992, pp. 44-47.

Von Babo, Michael, "Zehn Mythnum Computerviren: Dichtug Und Wahrheit Uber Den Schrecken Des Informatkzeitlers," Technische Kundschau, Hallwag, Bern CH vol. 84, No. 36. Sep. 4, 1992, pp. 44-47.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 29, 2002] Retrieved from the Internet: <URL: http//www.wackyb.co.nz/mesfp.html>.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki/phinti?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Proctection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Szor, P., "Memory Scanning Under Windows NT", Virus Bulletin Conference, Sep. 1999, Virus Bulletin Ltd. The Pentagon, Abingdon, Oxfordshire, England, pp. 1-22.

Choi, Yang-Seo, et al., "A New Stack Buffer Overflow Hacking Defense Technique with Memory Address Confirmation", Lecture Notes in Computer Science 2288, 2002, pp. 146-159, Springer Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Randustack web pages [online]. Virtualave.net [first retrieved May 1, 2003]. Retrieved from the Internet: <URL: http://pageexec.virualave.net/docs/randustack.txt>. copy retrieved May 21, 2005 from <http://www.pax.grsecurity.net/docs/randustack.txt>.

Randkstack web pages [online]. Virtualave.net [first retrieved May 1, 2003]. Retrieved from the Internet: <URL: http://pageexec.virualave.net/docs/randkstack.txt>, copy retrieved Mar. 21, 2005 from <http://www.pax.grsecurity.net/docs/randkstack.txt>.

Randmap web pages [online]. Virtualave.net [first retrieved May 1, 2003]. Retrieved from the Internet: <URL: http://pageexec.virualave.net/docs/randmmap.txt>, copy retrieved Mar. 21, 2005 from <http://www.pax.grsecurity.net/docs/randmmap.txt>.

Randexec web pages [online]. Virtualave.net [first retrieved May 1, 2003]. Retrieved from the Internet: <URL: http://pageexec.virualave.net/docs/randexec.txt>, copy retrieved May 21, 2005 from <http://www.pax.grsecurity.net/docs/randexec.txt>.

VMA Mirroring web pages [online]. Virtualave.net [retrieved May 1, 2003]. Retrieved from the Internet: <URL: http://pageexec.virualave.net/docs/vmmiror.txt>, copy retrieved Mar. 21, 2005 from <http://www.pax.grsecurity.net/docs/vmmiror.txt>.

Aho, Alfred V., et al. Compilers, Addison-Wesley Publishing Company, USA, revised edition 1988, pp. 585-598, 633-648.

Periot, Frederic, "Defeating Polymorphism Through Code Optimization", Paper given at the Virus Bulletin conference, Sep. 26-Oct. 27, 2003 pp. 142-159, Toronto, Canada, published by Virus Bulletin Ltd., The pentagon, Abington, Oxfordshire, England.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36. Sep. 4, 1992, pp. 44-47.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

* cited by examiner

STREAM SCANNING THROUGH NETWORK PROXY SERVERS

TECHNICAL FIELD

This invention relates generally to enhancing the performance of malicious code detection methods for proxy server computers. More specifically, this invention relates to methods for selectively passing forward file contents that have previously been scanned for the presence of malicious code.

BACKGROUND ART

During the brief history of computers, system administrators and users have been plagued by attacking agents such as viruses, worms, and Trojan Horses, which are designed to disable host computer systems or propagate themselves to connected systems.

In recent years, two developments have increased the threat posed by these attacking agents. Firstly, increased dependence on computers to perform mission critical business tasks has increased the economic cost associated with system downtime. Secondly, increased interconnectivity among computers has made it possible for attacking agents to spread to a large number of systems in a matter of hours.

Many network systems employ proxy servers to provide additional protection against attacking agents. These proxy servers manage interaction such as HyperText Transport Protocol (HTTP) communications between client systems and outside systems. This manner of setup allows network administrators to control and monitor those sites which are accessed by users and institute an additional layer of protection by configuring the proxy server to scan any incoming files for infection by attacking agents.

However, this additional layer of protection can place significant performance demands on the proxy and greatly increase transmission latency. Many attacking agents can be detected only after a file has been fully downloaded. Detection of these agents typically requires access to non-sequential sections of the file as well as the ability to emulate the execution of the file and monitor its output. The time required to fully download a large file and scan it before beginning to transmit the file to a client can generate frustrating delays for users of client systems.

What is needed is a method for reducing the latency of files transmitted through scanning proxy servers.

DISCLOSURE OF INVENTION

The present invention comprises methods, systems, and computer readable media for managing transmission of a requested computer file (140) from a remote host computer (125) to a client computer (120). A proxy server computer (110) receives a first chunk (315) of the requested computer file (140). The proxy server (120) generates a hash of the chunk (315) and compares the hash to a hash of a chunk of previously downloaded file. If the two hashes are identical, the chunk (315) of the requested computer file (140) is passed to the client computer (120).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

The present invention comprises systems, methods, and computer readable media for verifying that a computer file 140 is free of malicious code before passing the computer file 140 to a client computer 120. As used herein, the term "malicious code" refers to any program, module, or piece of code that enters a computer without an authorized user's knowledge and/or without an authorized user's consent. The term "attacking agent" includes Trojan Horse programs, worms, viruses, and other such insidious software that insert malicious code into a computer file 140. An attacking agent may include the ability to replicate itself and compromise other computer systems.

Figure 1:
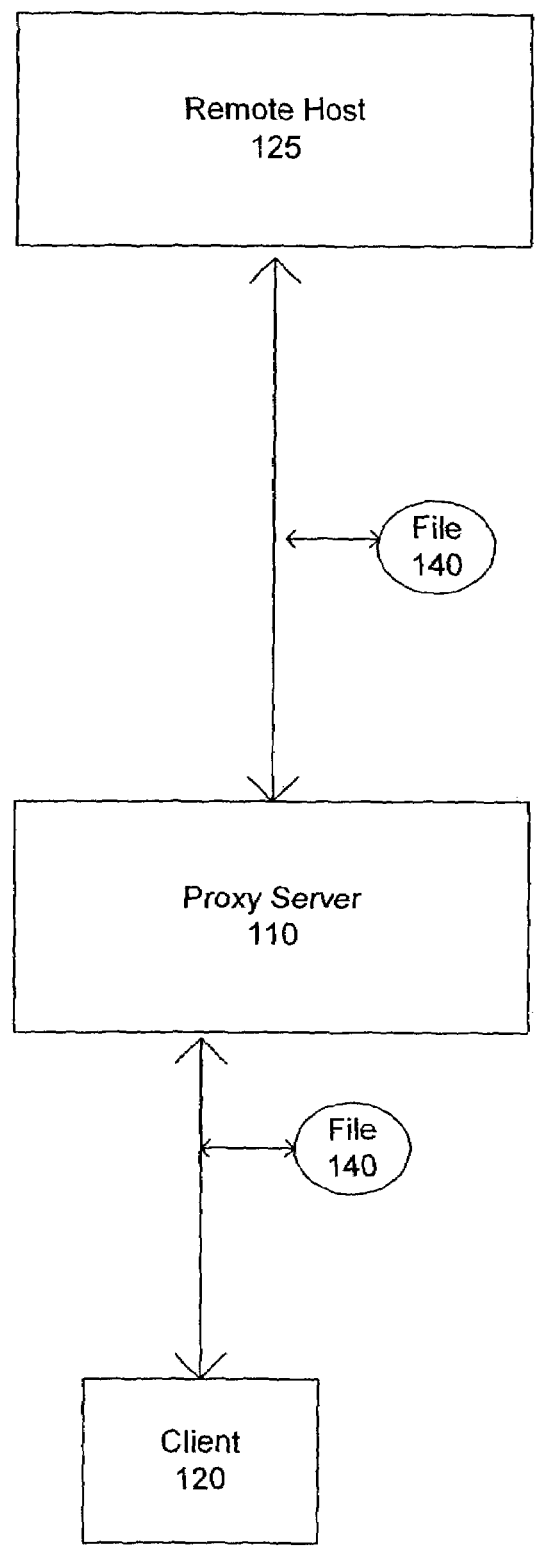
FIG. 1 is a high level block diagram illustrating interaction among a remote host computer 125, a proxy server computer 110, and a client computer 120.

FIG. 1 is a high level block diagram illustrating interaction among a remote host computer 125, a proxy server computer 110, and a client computer 120. The client computer 120 is a conventional computer, which may be employed by a user for accessing Web content and performing other computing tasks. The remote host computer 125 can be any computer system which a user of the client computer 120 may wish to access. In one embodiment, the remote host computer 125 is an HTTP server on the Internet.

The proxy server computer 110 manages the transfer of files 140 from the remote host computer 125 to the client computer 120. In one embodiment, the proxy server computer 110 shares an internal Local Area Network (LAN) or Wide Area Network (WAN) with the client computer 120, and controls all access between the client computer 120, and computers outside the internal network. In an alternate embodiment, the proxy server 110 communicates with the client computer 120 through the Internet and uses the proxy server computer 110 to provide an additional layer of security.

When the client computer 120 attempts to access a computer file 140 stored on the remote server 125, it transmits a request to the proxy server computer 110 that includes a Uniform Resource Locator (URL) for the computer file 140. The proxy server computer 110 receives the request and transmits a conventional file retrieval request to the remote host computer 125, which transmits the computer file 140 to the proxy server computer 110.

The proxy server computer 110 verifies that the computer file 140 is free of malicious code. The process of verifying that the computer file 140 is free of malicious code is described in greater detail with respect to FIG. 6. If the computer file 140 is free of malicious code, the proxy server computer 110 transmits the computer file 140 to the client computer 120.

If the computer file 140 contains malicious code, the proxy server computer 110 blocks transmission of the file 140. Alternately, the proxy server computer 110 can remove the malicious code from the computer file 140 and transmit the cleaned file to the client computer 120. In one embodiment, the proxy server computer 110 maintains a cache of recently downloaded files to minimize bandwidth demands between the proxy server computer 110 and the remote host computer 125.

While in the present embodiment, the proxy server 110 interacts with an independent client computer system 120, in an alternate embodiment, the functions of the client computer system 120 can be performed by an application running on an enterprise server or any combination of software and hardware.

Additionally, while the embodiments disclosed below refer to a proxy server 120 which manages HTTP communications between client computers 120 and remote host computer 125, in alternate embodiments, the proxy server also manages File Transfer Protocol (FTP) communications and streaming media communication.

Figure 2:
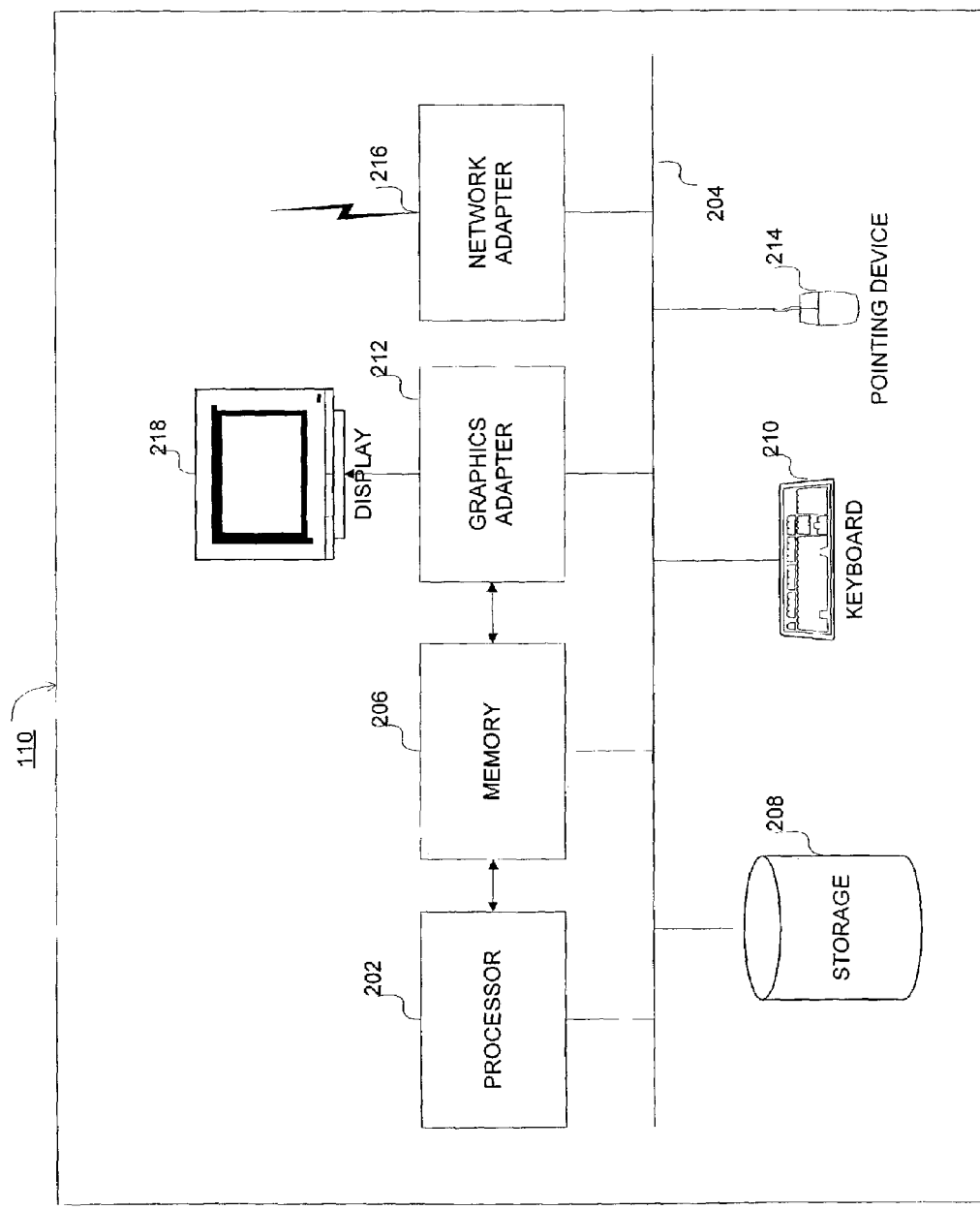
FIG. 2 is a high level block diagram illustrating a more detailed view of a proxy server computer system 110.

FIG. 2 is a high level block diagram illustrating a more detailed view of a proxy server computer system 110. Illustrated are a processor 202 coupled to a bus 204. There may be more than one processor 202. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any specific or general-purpose processor such as an INTEL x86 or POWERPC-compatible central processing unit (CPU). The storage device 208 may be any device capable of holding large amounts of data, such as a hard drive, compact disk read-only memory (CD-ROM), DVD, or some other form of fixed or removable storage device.

Figure 3:
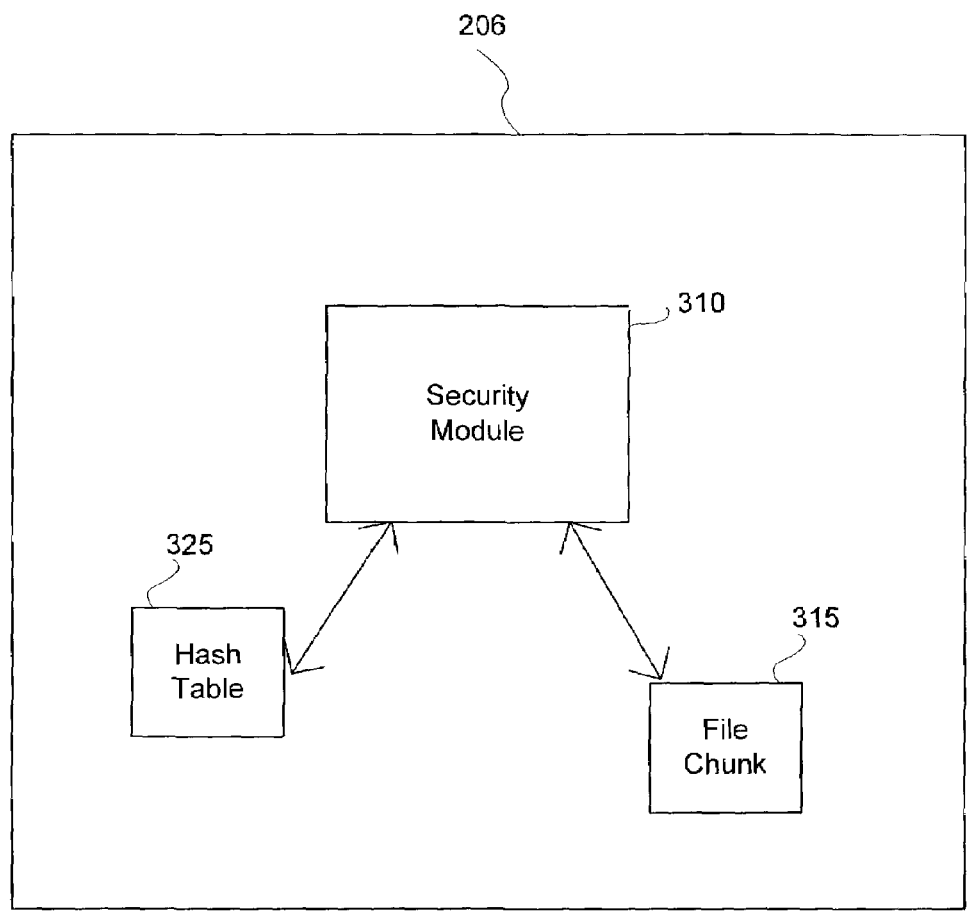
FIG. 3 is a more detailed view of the memory 206 of the proxy server computer 110.

FIG. 3 is a more detailed view of the memory 206 of the proxy server computer 110. The memory 206 includes a security module 310, which is configured to verify that a computer file 140 is free of infection before passing the computer file 140 to the client computer 120. As used herein, the term "module" refers to computer program logic and/or any hardware or circuitry utilized to provide the functionality attributed to the module. A module may be implemented in hardware, software, firmware, or any combination thereof.

When the proxy server computer 110 transmits an HTTP request to the remote host computer 125, the remote host computer 125 begins to stream the computer file 140 to the proxy server computer 110.

When the proxy server computer 110 receives a first chunk 315 of the computer file 140, the security module 308 determines whether the chunk 315 is identical to a previously downloaded file chunk 315. The proxy server 110 checks in a hash database for a hash entry having an identifier that indicates that the hash stored in the hash entry is a hash of a chunk the same file and compares the newly downloaded hash to the stored hash. The organization of the hash database is described in greater detail with respect to FIG. 4. As used herein, the term "chunk" refers to any continuous section of a file 140. In one embodiment, chunks are 64 KB or smaller. The security module 310 then generates a hash of the file chunk 315.

As used herein, a "hash" or "hash function" is a substantially collision free one-way function, from a variable sized input to a fixed size output. Normally, the output is smaller than the input. "One-way" means that it is easy to compute the output from the input, but computationally infeasible to compute the input from the output. "Substantially collision free" means that it is very difficult to find two or more inputs that hash to the same output. Examples of suitable hash functions usable in the present invention are MD5 and a CRC (Cyclic Redundancy Check) function.

The security module 310 then checks the hash table 325, which stores hashes of previously downloaded chunks, for a previously generated hash of the first chunk 315 of the requested computer file 140. The hash table 325 is stored in a local or remote cache and stores hashes of file chunks 315. The hash table 325 is periodically emptied when new threat definitions are made available to the security module 310. Alternately, the hash table 325 may be updated at regular intervals.

If the previously generated hash is present in the hash table 325, the security module 310 compares it to the hash of the first chunk of the requested computer file 140. If a hash corresponding to the new chunk 315 is not present or is not identical, the security module 310 downloads the full computer file 140 to the client computer 120. The security module 310 scans the computer file 140 for the presence of malicious code. If the computer file 140 contains malicious code, the security module 308 blocks transmission of the computer file 140. If the computer file 140 does not contain malicious code, the computer file 140 is transmitted to the client computer 120.

If the hashes are identical, the security module 310 passes the first chunk to the client computer 120. This process is repeated for each succeeding chunk until a chunk is received whose hash does not match the corresponding hash in the hash table 325, or the computer file 140 is fully transmitted to the client computer 120. This process is described in greater detail with respect to FIG. 6.

Figure 4:
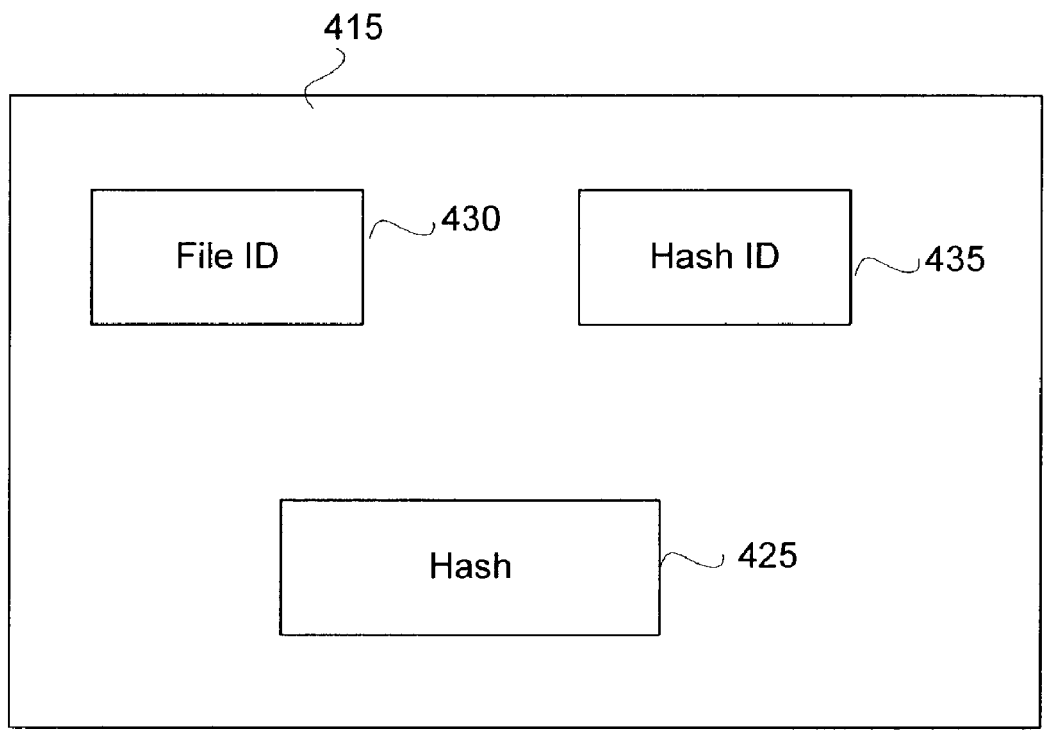
FIG. 4 is a block diagram illustrating an entry 415 in the hash table 325 within memory 206.

FIG. 4 is a block diagram illustrating an entry 415 in the hash table 325. The entry includes a hash 425 of a chunk 315 of a previously downloaded computer file 140. The entry 415 additionally includes a file identifier 430 that indicates the computer file 140 from which the associated chunk 315 was extracted. The file identifier 430 is used by the security module 310 to initially locate a hash of a requested computer file 140. The file identifier 430 typically includes the name of the computer file 140, but may also include characteristics such as its size and associated URL. In an alternate embodiment, the hash 425 itself serves as an identifier. The entry 415 additionally includes a hash ID 435 indicating a location in the computer file 140 from which the chunk 310 was taken. For example, in one embodiment the hash ID 435 indicates that the hash 425 is extracted from a chunk 315 located between offsets CA0000 and CAFFFF (memory locations in hexadecimal notation). In an alternate embodiment, a single hash entry 415 includes all of the hashes for a single computer file 140.

Figure 5:
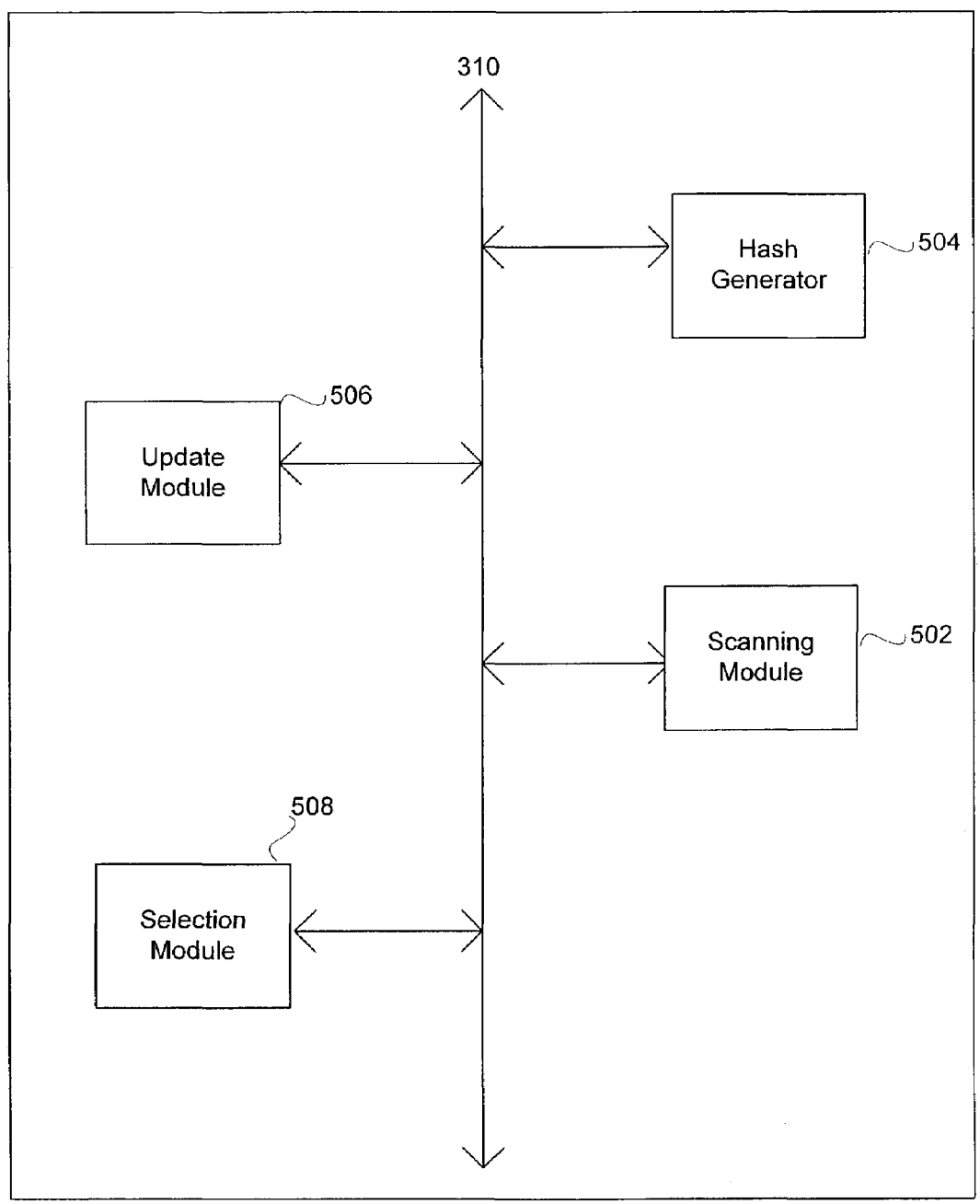
FIG. 5 is a more detailed view of a security module 310.

FIG. 5 is a more detailed view of a security module 310. The security module 310 comprises a group of constituent modules that perform various functions of the security module 310.

The security module 310 includes a selection module 508. The selection module 508 is configured to compare a hash of a chunk 315 of a requested computer file 140 to a previously generated hash 425. If the two hashes are identical, the selection module 508 passes the chunk 315 to the client computer 120. If the two hashes are not identical, the selection module 508 holds the chunk 315 until the entire computer file 140 has been downloaded.

The security module 310 additionally includes a hash generator 504. The hash generator 504 is configured to generate hashes of chunks 315 of files 140 for comparison with previously generated hashes stored in the hash table 325.

The security module 310 further includes a scanning module 502. The scanning module 502 is configured to check a computer file 140 for the presence of malicious code. The scanning module 502 typically checks selected areas of a computer file 140 for distinct code sequences or other signature information. Alternately, the scanning module 502 may check the computer file 140 for distinctive characteristics, such as a particular size.

The scanning module 502 can additionally apply more complex detection techniques to a computer file 140. For example, the scanning module 502 can detect the presence of a polymorphic encrypted virus. A polymorphic encrypted virus ("polymorphic virus") includes a decryption routine and an encrypted viral body. To avoid standard detection techniques, polymorphic viruses use decryption routines that are functionally the same for each infected computer file 140, but have different sequences of instructions. To detect these viruses, the scanning module 502 applies an algorithm that loads the executable computer file 140 into a software-based CPU emulator acting as a simulated virtual computer. The computer file 140 is allowed to execute freely within this virtual computer. If the executable computer file 140 does contain a polymorphic virus, the decryption routine is allowed to decrypt the viral body. The scanning module 502 detects the virus by searching through the virtual memory of the virtual computer for a signature from the decrypted viral body. The scanning module 502 may also be configured to detect metamorphic viruses, that, while not necessarily encrypted, also vary the instructions stored in the viral body.

Furthermore, the security module 310 includes an update module 506. The update module 506 is configured to update the hash table 325 after a computer file 140 has been scanned for the presence of malicious code. The update module 506 generates new entries in the hash table 325 for files lacking entries and updates hashes 435 for files 140 that already have entries 415 in the hash table 325.

Figure 6:
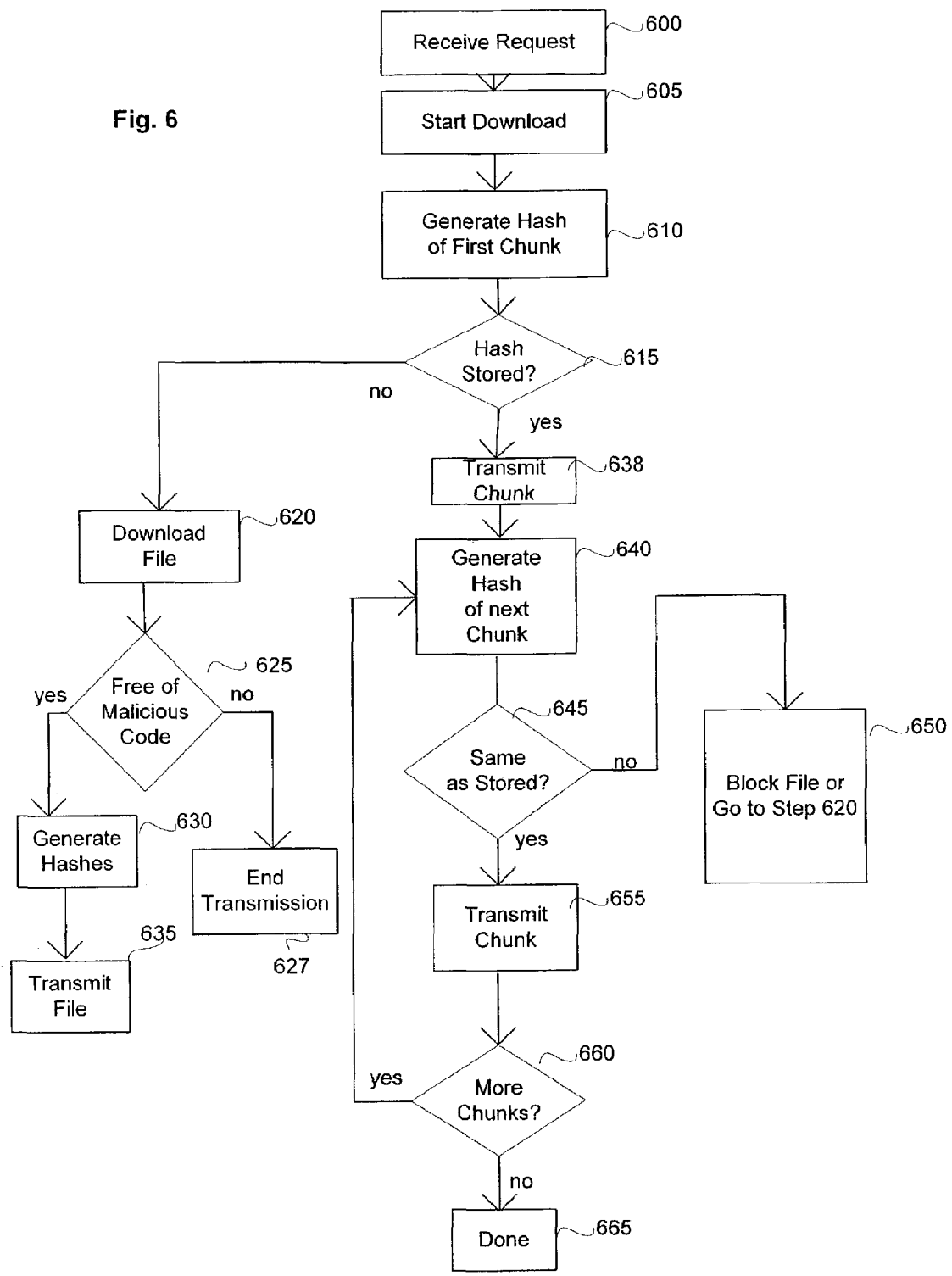
FIG. 6 is a flow chart illustrating an embodiment of the present invention.

FIG. 6 is a flow chart illustrating an embodiment of the present invention. The process begins with the proxy server computer 110 receiving 600 a request to download a computer file 140 from a remote host computer 125. The proxy server computer 110 begins downloading 605 the computer file 140 from the remote host computer 125. When the proxy server computer 110 receives the first chunk 310 of the computer file 140, the selection module 508 checks 615 the hash table 325 for the presence of an identical hash. Step 615 enables the proxy server computer 110 to determine if the file 140 has been previously downloaded, as it is unlikely that the hash table 310 would store an identical hash if the same file 140 had not been downloaded earlier.

If an identical hash does not appear in the hash table 325, the proxy server computer 110 allows the complete computer file 140 to download 620 to the proxy server 110. When the computer file 140 has been downloaded in its entirety, the scanning module 502 scans the computer file 140 to determine 625 whether the computer file 140 contains malicious code. If the computer file 140 is found by the scanning module 502 to contain malicious code, the selection module 508 blocks 627 transmission of the computer file 140 to the client computer. Alternately, the scanning module 502 can repair the computer file 140 and transmit the repaired computer file 140 to the client computer 120. In one embodiment, the repaired computer file 140 is cached on the proxy server computer 125. If a similarly infected file 140 is detected by the proxy server computer 125, it can transmit the cached repaired file 140 to the client computer 120, rather than repair the infected file 140.

If the computer file 140 is found by the scanning module 502 to be free of malicious code, the hash generator 604 generates a hash of all the constituent chunks 315 of the computer file 140 and stores them in new entries in the hash table 325. These hashes are stored for later comparison against future files that the proxy server computer 110 downloads at the request of the client computer 120. The computer file 140 is then transmitted 635 to the client computer 120. In an alternate embodiment, the hash generator generates new hashes of the chunks 315 of the computer file 140 as the chunks 315 are received, rather than generating the hashes after the file download is completed.

If a hash that is identical to the generated hash of the downloaded chunk 315 of the computer file 140 appears in the hash table 325, this means that the file 140 has likely been downloaded and scanned by the proxy server 110. Thus, the selection module 508 transmits 638 the chunk 315 to the client computer 120. The hash generator 504 then generates 640 a hash of the file chunk 315, and the selection module 508 compares 645 the hash to a corresponding hash in the hash table 325. If the hashes are different or if no corresponding hash exists in the hash table 325, the selection module 508 determines that the file 140 is not identical to a previously scanned file and ends 650 the download.

In an alternate embodiment, the selection module 508 permits the file 140 to download to the proxy server 110 as indicated in step 620. The scanning module 502 then scans 625 the file 140 for the presence of malicious code. If the file 140 contains malicious code, the scanning module 502 can cancel 627 the download the file 140 or clean the file 140 of malicious code and pass it to the client computer 120. If the file 140 does not contain malicious code, the selection module 508 passes 635 the file 140 to the client computer 120 and updates the associated hash entries 415 to store the hashes 425 of the new version of the file 140.

If more chunks 315 are determined 660 to remain in the computer file 140, steps 640, 645, 650, and 655 are repeated until the computer file 140 has been transmitted.

The above description is included to illustrate the operation of the preferred embodiments and is not meant to limit the scope of the invention The scope of the invention is to be limited only by the following claims. From the above discussion, many variations will be apparent to one skilled in the relevant art that would yet be encompassed by the spirit and scope of the invention.

What is claimed is:

1. A method for managing transmission of a requested computer file from a remote host to a client, the method comprising the steps of:

receiving a chunk of the requested computer file from the remote host;

generating a hash of the chunk of the requested computer file;

comparing the hash of the chunk of the requested computer file to a hash of a chunk of a previously downloaded computer file; and transmitting the chunk of the requested file to the client when the hash of the chunk of the requested computer file is identical to the hash of the chunk of the previously downloaded computer file.

2. The method of claim 1, further comprising the step of receiving a remainder of the requested computer file when the hash of the chunk of the requested computer file is not identical to the hash of the chunk of the previously downloaded computer file.

3. The method of claim 2, further comprising the step of scanning the requested computer file for the presence of malicious code.

4. The method of claim 3, further comprising the step of transmitting the requested computer file to the client when the requested computer file is found to be free of malicious code.

5. The method of claim 3, further comprising the step of generating new hashes of chunks of the requested computer file when the requested computer file is free of malicious code.

6. The method of claim 3, further comprising the steps of:
determining that the file contains malicious code;
removing the malicious code from the file; and
transmitting the file to the client.

7. The method of claim 6, further comprising storing a repaired copy of the file in a cache.

8. The method of claim 7, further comprising:
downloading a chunk of a second requested computer file;
generating a hash of the chunk of the second requested computer file;
comparing the hash of the chunk of the second requested computer file to a hash of a chunk of the previously downloaded computer file; and
transmitting the repaired copy of the file to the client when the hash of the chunk of the second requested computer file is not identical to the hash of the chunk of the previously downloaded computer file.

9. The method of claim 1, further comprising the step of ending a transmission of the requested computer file to the client when the hash of the chunk of the requested computer file is not identical to the hash of the chunk of the previously downloaded computer file.

10. The method of claim 1, wherein the step of comparing the hash of the chunk of the requested computer file to a hash of a chunk of a previously downloaded computer file comprises the sub-steps of:
checking a cache for a hash of a chunk of a computer file corresponding to the requested computer file; and
determining that the hash of the chunk of the requested computer file is not identical to a hash of a chunk of a previously downloaded computer file when the cache does not contain a hash of a chunk of a computer file corresponding to the requested computer file.

11. A system for managing transmission of a requested computer file from a remote host to a client, the system comprising:
a selection module configured to:
receive a chunk of the requested computer file from the remote host;
compare a hash of the chunk of the requested computer file to a hash of a chunk of a previously downloaded computer file; and
transmit the chunk of the requested file to the client when the hash of the chunk of the requested computer file is identical to the hash of the chunk of the previously downloaded computer file; and
a hash generator, coupled to the selection module, and configured to generate a hash of the chunk of the requested computer file.

12. The system of claim 11, wherein the selection module is further configured to receive a remainder of the requested computer file when the hash of the chunk of the requested computer file is not identical to the hash of the chunk of the previously downloaded computer file.

13. The system of claim 12, further comprising a scanning module, coupled to the selection module, and configured to scan the requested computer file for the presence of malicious code.

14. The system of claim 13, wherein the selection module is further configured to transmit the requested computer file to the client when the requested computer file is found by the scanning module to be free of malicious code.

15. The system of claim 13, wherein the hash generator is further configured to generate new hashes of chunks of the requested computer file when the scanning module has scanned the requested computer file and the requested computer file is found by the scanning module to be free of malicious code.

16. The system of claim 11, wherein the selection module is further configured to end a transmission of the requested computer file when the hash of the chunk of the requested computer file is not identical to the hash of the chunk of the previously downloaded computer file.

17. A computer-readable medium containing computer code instructions for managing transmission of a requested computer file from a remote host to a client, the computer code comprising instructions for:
receiving a chunk of the requested computer file from the remote host;
generating a hash of the chunk of the requested computer file;
comparing the hash of the chunk of the requested computer file to a hash of a chunk of a previously downloaded computer file; and
transmitting the chunk of the requested file to the client when the hash of the chunk of the requested computer file is identical to the hash of the chunk of the previously downloaded computer file.

18. The computer readable medium of claim 17, wherein the instructions for managing transmission of a requested computer file from a remote host to a client further comprise instructions for receiving a remainder of the requested computer file when the hash of the chunk of the requested computer file is not identical to the hash of the chunk of the previously downloaded computer file.

19. The computer readable medium of claim 18, wherein the instructions for managing transmission of a requested computer file from a remote host to a client further comprise instructions for scanning the requested computer file for the presence of malicious code.

20. The computer readable medium of claim 19, wherein the instructions for managing transmission of a requested computer file from a remote host to a client further comprise instructions for transmitting the requested computer file to the client when the requested computer file is found to be free of malicious code.

21. The computer readable medium of claim 20, wherein the instructions for managing transmission of a requested computer file from a remote host to a client further comprise instructions for generating new hashes of chunks of the requested computer file when the requested computer file is found to be free of malicious code.

22. The computer readable medium of claim 17, wherein the instructions for managing transmission of a requested computer file from a remote host to a client further comprise instructions for ending a transmission of the requested computer file to the client when the hash of the chunk of the requested computer file is not identical to the hash of the chunk of the previously downloaded computer file.

23. The computer readable medium of claim 17, wherein the instructions for comparing the hash of the chunk of the requested computer file to a hash of a chunk of a previously downloaded computer file comprises instructions for:

checking a cache for a hash of a chunk of a computer file corresponding to the requested computer file; and determining that the hash of the chunk of the requested computer file is not identical to a hash of a chunk of a previously downloaded computer file when the cache does not contain a hash of a chunk of a computer file corresponding to the requested computer file.

* * * * *

UNITED STATES PATENT AND TRADEMARK OFFICE
CERTIFICATE OF CORRECTION

PATENT NO. : 7,203,959 B2  Page 1 of 1
APPLICATION NO. : 10/388903
DATED : April 10, 2007
INVENTOR(S) : Nachenberg et al.

It is certified that error appears in the above-identified patent and that said Letters Patent is hereby corrected as shown below:

On the front page, line 3 of the Abstract, please change "compute" to --computer--.

Signed and Sealed this

Tenth Day of July, 2007

JON W. DUDAS
*Director of the United States Patent and Trademark Office*